(12) United States Patent
Haenga

(10) Patent No.: US 9,877,586 B2
(45) Date of Patent: Jan. 30, 2018

(54) STEMMED GLASS HOLDER

(71) Applicant: WINEREST PTY LTD., New South Wales (AU)

(72) Inventor: Mason Haenga, New South Wales (AU)

(73) Assignee: WINEREST PTY LTD, New South Wales (AU)

( * ) Notice: Subject to any disclaimer, the term of this patent is extended or adjusted under 35 U.S.C. 154(b) by 0 days.

(21) Appl. No.: 14/782,524

(22) PCT Filed: Jan. 30, 2015

(86) PCT No.: PCT/AU2015/050030
§ 371 (c)(1),
(2) Date: Oct. 5, 2015

(87) PCT Pub. No.: WO2015/113119
PCT Pub. Date: Aug. 6, 2015

(65) Prior Publication Data
US 2016/0029803 A1 Feb. 4, 2016

(30) Foreign Application Priority Data

Jan. 31, 2014 (AU) ................................ 2014900283

(51) Int. Cl.
*B65D 3/26* (2006.01)
*A47C 7/62* (2006.01)
*A47G 19/06* (2006.01)
*A47G 23/02* (2006.01)
*A47B 13/16* (2006.01)
(Continued)

(52) U.S. Cl.
CPC ................ *A47C 7/62* (2013.01); *A47B 13/16* (2013.01); *A47G 19/06* (2013.01); *A47G 23/0216* (2013.01); *F16B 1/00* (2013.01); *F16M 13/022* (2013.01); *F16B 2001/0028* (2013.01)

(58) Field of Classification Search
CPC .............................. A47G 23/0225; B60N 3/10
USPC ........... 248/152, 229.26, 310, 311.2, 346.11, 248/68.1; 220/737, 574, 575, 592.16; 206/426; 211/60.1
See application file for complete search history.

(56) References Cited

U.S. PATENT DOCUMENTS

| D87,682 S | * | 8/1932 | Stetson | ........................... D7/543 |
| 3,039,616 A | * | 6/1962 | Proffit | ................... B60N 3/103 |
| | | | | 108/152 |

(Continued)

FOREIGN PATENT DOCUMENTS

| CA | 2407732 A1 | * | 4/2004 | ......... A47G 23/0225 |
| CN | 201243895 Y | * | 5/2009 | |

(Continued)

*Primary Examiner* — Kimberly Wood
(74) *Attorney, Agent, or Firm* — Muncy, Geissler, Olds & Lowe, P.C.

(57) ABSTRACT

Disclosed herein is a stemmed glass holder. The stemmed glass holder comprises a glass holding portion and a resilient portion. The glass holding portion comprises an aperture, a periphery of the aperture defining a bowl support edge adapted to abut an underside of a bowl of the stemmed glass. The glass holding portion also comprises a passage via which a stem of the stemmed glass is slidable into and out of the aperture. The resilient portion normally blocks the passage, but is moveable to enable the stem to be slid through the passage.

8 Claims, 3 Drawing Sheets

(51) Int. Cl.
  *F16B 1/00* (2006.01)
  *F16M 13/02* (2006.01)

(56) References Cited

U.S. PATENT DOCUMENTS

| | | | | |
|---|---|---|---|---|
| 3,491,893 | A * | 1/1970 | Morris | A47B 13/16 211/162 |
| 4,213,649 | A * | 7/1980 | Sell | A47C 7/62 248/231.81 |
| 4,749,112 | A * | 6/1988 | Harper | A47G 23/0225 224/482 |
| D308,461 | S * | 6/1990 | Hosea | A47G 19/06 D7/507 |
| 5,114,038 | A * | 5/1992 | Laumann geb. Quensen | A47G 19/065 220/23.83 |
| D342,421 | S * | 12/1993 | DuBow | D7/708 |
| 5,294,000 | A * | 3/1994 | Yanuzzi | A47G 19/065 206/519 |
| 5,390,798 | A * | 2/1995 | Yanuzzi | A47G 19/065 206/519 |
| 5,769,264 | A * | 6/1998 | Lipkowitz | A47G 23/0625 220/23.83 |
| 5,950,856 | A * | 9/1999 | Cinque | A47G 19/065 220/23.4 |
| 5,967,345 | A * | 10/1999 | Subotin | A47C 7/62 211/119.007 |
| 6,021,914 | A * | 2/2000 | Schmidt | A47G 19/06 220/23.83 |
| 6,116,165 | A * | 9/2000 | Kadesky | A47B 23/002 108/161 |
| 6,244,554 | B1 * | 6/2001 | Baker | A47F 7/28 215/396 |
| D453,891 | S * | 2/2002 | Sussman | D7/553.1 |
| 7,000,799 | B1 * | 2/2006 | Hamre | A47G 19/065 220/23.8 |
| 7,334,908 | B1 * | 2/2008 | Figueroa | A47G 23/0208 362/101 |
| D563,726 | S * | 3/2008 | Fraser | D7/553.1 |
| D575,600 | S * | 8/2008 | Mayer | D7/553.1 |
| D595,093 | S * | 6/2009 | McComas | D7/546 |
| 7,562,785 | B2 * | 7/2009 | Meissen | B65D 81/36 220/4.28 |
| D614,926 | S * | 5/2010 | Cox | D7/708 |
| 2004/0099670 | A1 * | 5/2004 | Michaeli | A47G 19/06 220/574 |
| 2005/0017134 | A1 * | 1/2005 | Hooper | A47G 23/0241 248/103 |
| 2008/0264822 | A1 * | 10/2008 | Faiola | A47G 19/06 206/561 |
| 2010/0078350 | A1 * | 4/2010 | Raynor | A47G 23/0225 206/564 |
| 2011/0132914 | A1 * | 6/2011 | Vernes | A47G 19/06 220/575 |
| 2011/0174940 | A1 | 7/2011 | Cai | |
| 2011/0186698 | A1 * | 8/2011 | McDonnell | A47C 7/546 248/118 |
| 2012/0305716 | A1 * | 12/2012 | McKay | A47G 23/0225 248/146 |
| 2013/0105650 | A1 | 5/2013 | Cohen | |
| 2014/0209769 | A1 * | 7/2014 | DeWald | B60N 3/10 248/226.11 |

FOREIGN PATENT DOCUMENTS

| | | | |
|---|---|---|---|
| FR | 2817135 A1 | 5/2002 | |
| GB | 2085061 A * | 4/1982 | A47G 23/0225 |
| GB | 2143425 A * | 2/1985 | H01R 13/60 |

\* cited by examiner

STEMMED GLASS HOLDER

TECHNICAL FIELD

The present invention relates to a stemmed glass holder and, in some forms, to a stemmed glass holder for use with camping chairs.

BACKGROUND ART

Due to their shape and configuration, stemmed glasses are potentially unstable if not supported on a completely flat and stable surface. The stem and bowl of the stemmed glass, whilst being aesthetically pleasing, make the glass very top heavy and thus susceptible to being knocked over. This instability can be exacerbated is situations where the stemmed glasses are not being used in a household environment, where stable and flat surfaces are not readily available.

For example, many people now own a portable chair for use whilst camping, attending music festivals or picnicking. When using such a chair, however, the user is left with a dilemma about where to place their wine glass if they do not want to hold it all of the time. There is often no table or other safe, flat surface nearby, and wine glasses are commonly placed on the ground adjacent to the chair. However, when in this position, the wine glasses are susceptible to being accidentally knocked over by the user or another person, or simply tipping over because of the uneven surface.

Whilst such chairs often have receptacles for bottles (e.g. beer bottles), these receptacles are not suitable for securely supporting stemmed glasses (especially if the bowl of the stemmed glass contains wine or the like, making it even more top heavy). Stemmed glass holders suitable for use with portable chairs are known, but have been found to be generally difficult to use and, more importantly, not capable of securely holding the stemmed glass. It would be advantageous to provide an alternative to the presently available stemmed glass holders.

SUMMARY OF INVENTION

In a first aspect, the present invention provides a stemmed glass holder. The stemmed glass holder comprises a glass holding portion and a resilient portion. The glass holding portion comprises an aperture, a periphery of the aperture defining a bowl support edge adapted to abut an underside of a bowl of the stemmed glass. The glass holding portion also comprises a passage via which a stem of the stemmed glass is slidable into and out of the aperture. The resilient portion normally blocks the passage, but is moveable to enable the stem to be slid through the passage.

The stemmed glass holder of the present invention provides a secure holder for stemmed glasses. Once inside the holder, a stemmed glass cannot easily escape. The aperture is smaller than the bowl of the stemmed glass, which would usually mean that the foot of the glass would also not be able to pass through the aperture. However, even should the foot of the stemmed glass be capable of passing through the aperture, it would typically require a straight upwards lifting motion to lift the foot through the aperture, which would be unlikely to occur without a user deliberately doing this. The glass is also prevented from being accidentally knocked out of the holder by a sideways movement because the passage is normally blocked by the resilient portion, and a deliberate effort is required on behalf of the user to move the resilient portion and slide the stem of the glass into or out from the aperture.

In use, the underside of the bowl of the stemmed glass abuts the bowl support edge, effectively cradling the glass within the aperture of the glass holding portion of the stemmed glass holder. It is a simple matter for the user to remove the glass. They simply lift the glass slightly and then slide its stem along the length of the passage whilst moving the resilient portion. In some embodiments (discussed below), the act of sliding the glass may cause the stem of the glass itself to move the resilient portion whilst it slides through the passage, thus providing an even simpler operation. The process is reversed when the user wants to re-insert the glass into the holder.

In some embodiments, the resilient portion comprises a member which overlies the passage, the member being moveable to enable the stem to be slid through the passage.

In some embodiments, the resilient portion comprises a tab which overlies at least a portion of the passage between a side of the stemmed glass holder and the aperture.

In some embodiments, the resilient portion comprises a tab which overlies substantially all of the passage, by extending substantially between a side of the stemmed glass holder and the aperture.

In some embodiments, the resilient portion comprises first and second tabs which extend from opposing sides of the passage and overlap each other. The first and second tabs may, for example, overlap each other (e.g. by about 2 mm) around a centre of the passage.

In some embodiments, the aperture is substantially circular in order to define a circular bowl support edge which will most closely conform to the underside of a typical stemmed glass's bowl.

In some embodiments, the stemmed glass holder (or at least the glass holding portion of the stemmed glass holder) is a substantially planar member. In some embodiments, the stemmed glass holder (or at least the glass holding portion of the stemmed glass holder) is substantially elongate. In some embodiments, the stemmed glass holder (or at least the glass holding portion of the stemmed glass holder) is substantially rectangular.

In embodiments where the stemmed glass holder is substantially elongate or rectangular, the passage may extend between a longitudinal side of the glass holding portion of the stemmed glass holder and the aperture. The passage will therefore extend to the left or the right side of the aperture, depending on which way the stemmed glass holder is orientated (i.e. depending on which of the opposing faces of the stemmed glass holder is facing upwards). In this manner, the holder is adaptable to be used by either left-handed or right-handed people, and on either side of an item (e.g. either arm of a camping chair).

In some embodiments, the glass holding portion is covered by a cover made of a resilient material, the cover comprising a hole adapted to align with the aperture. In some embodiments, the hole may be slightly smaller than the aperture. The cover may, in some embodiments, further comprise a tab or tabs which overlie the passage and define the resilient portion of the stemmed glass holder.

In some embodiments, the stemmed glass holder further comprises an attacher for attaching the stemmed glass holder to an item. As will be appreciated, the stemmed glass holder of the present invention can be provided integrally formed with an item (e.g. integrally formed in the arm of a camping chair) or provided as a discrete unit, which can be attached to a variety of items and in a variety of orientations, as discussed herein.

In some embodiments, the attacher is adapted to releasably attach the stemmed glass holder to the item (i.e. the holder is portable and can be transferred between items).

In some embodiments, the attacher is adapted to attach the stemmed glass holder to the item in a variety of orientations (e.g. via either of the opposing faces of a substantially planar stemmed glass holder), thus providing the ambidexterity discussed above.

In some embodiments, the attachment portion comprises fasteners (e.g. VELCRO hook-and-loop fastener straps) for attaching the stemmed glass holder to the item.

In a second aspect, the present invention provides a stemmed glass holder. The stemmed glass holder comprises a glass holding portion and a resilient portion. The glass holding portion comprises opposing faces with an aperture therebetween, a periphery of the aperture defining a bowl support edge adapted to abut an underside of a bowl of the stemmed glass. The glass holding portion also comprises a passage between a side of the glass holding portion and the aperture, whereby a stem of the stemmed glass is slidable into and out of the aperture through the passage. The resilient portion normally blocks the passage, but is moveable to enable the stem to be slid through the passage.

Embodiments of the second aspect of the present invention may be as described herein with respect to embodiments of the first aspect of the present invention.

BRIEF DESCRIPTION OF DRAWINGS

Specific embodiments of the present invention will now be described, by way of example only, with reference to the accompanying drawings in which.

DESCRIPTION OF EMBODIMENTS

Figure 1:
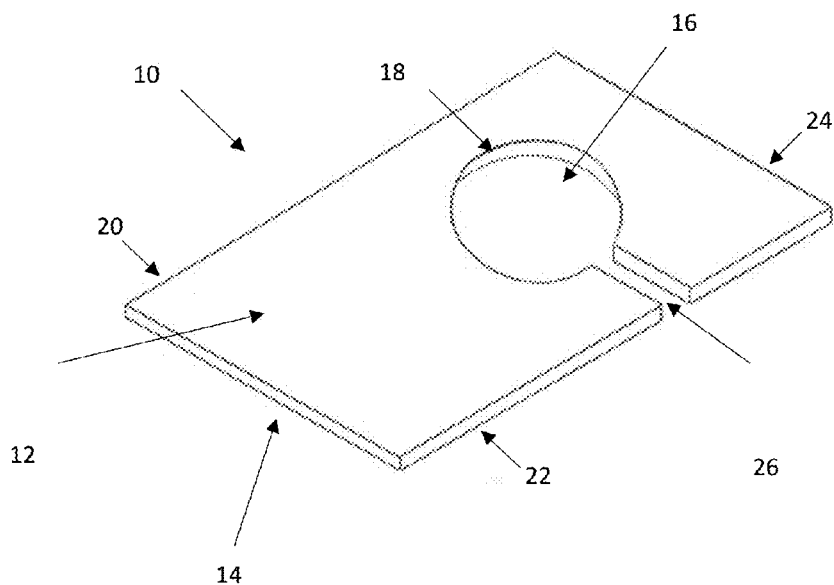
FIG. 1 shows a perspective view of part of a stemmed glass holder in accordance with an embodiment of the present invention.

The present invention provides a stemmed glass holder. In a first aspect, the stemmed glass holder comprises a glass holding portion and a resilient portion. The glass holding portion of the stemmed glass holder comprises an aperture, the periphery of which defines a bowl support edge adapted to abut an underside of a bowl of the stemmed glass. The glass holding portion also comprises a passage via which a stem of the stemmed glass can be slid into and out of the aperture. The resilient portion of the stemmed glass holder normally blocks the passage, but is moveable to enable the stem to be slid through the passage.

As used herein, a "stemmed glass" is intended to encompass any stemmed beverage container, regardless of whether it is made from glass, Perspex, plastic, ceramic, or any other suitable material.

The stemmed glass holder of the present invention may be used whenever a user wants to safely hold a stemmed glass in situations where safe, flat surfaces are not readily available. The holder may be used with items such as outdoor furniture (e.g. chairs, camping chairs, banana lounges, etc.), tables, barbeques or railings.

The stemmed glass holder has a glass holding portion. The glass holding portion has an aperture and a passage via which a stem of the stemmed glass can be slid into and out of the aperture (i.e. which extends between a side of the stemmed glass holder and the aperture). In embodiments where glass holding portion has opposing faces, the aperture extends therebetween. The opposing faces of the glass holding portion may have any form, provided that they do not interfere with the intended use of the stemmed glass holder.

In some forms, the glass holding portion is a substantially rigid planar member (i.e. its opposing faces are substantially planar surfaces), as such a structure has the requisite structural properties (e.g. strength, weight, etc.) whilst using a minimum of material. The glass holding portion may, for example, be substantially elongate. The glass holding portion may, for example, be substantially rectangular.

In some embodiments, the glass holding portion may comprise a significant portion of the stemmed glass holder, such that the shape and form of the stemmed glass holder essentially the same as or very similar to that of its glass holding portion. Thus, in some embodiments, the stemmed glass holder is also a substantially rigid planar member. In some embodiments, the stemmed glass holder may be substantially elongate, for example, substantially rectangular.

The glass holding portion may be formed from any material which provides the necessary strength to hold a (potentially full) stemmed glass whilst attached to an item. Suitable materials include plastic materials (e.g. polyethylene board), hard rubbers, light sheet metals (e.g. aluminium), carbon fibre or wood.

For example, the inventor has found that glass holding portions formed from a rigid plastic sheet being about 4 mm thick, 140 mm long and 90 mm wide can safely hold wine glasses.

The aperture has a periphery that defines a bowl support edge which, in use, abuts an underside of a bowl of the stemmed glass, thereby supporting the glass and holding it within the stemmed glass holder. In the context of the present invention, it is not necessary for the bowl of the stemmed glass to physically contact the bowl support edge, provided that the bowl is adjacent to and supported by the bowl support edge. For example, in embodiments of the present invention including a cover (discussed below), the bowl of the stemmed glass will be supported by the bowl support edge, but will only physically contact the cover. The aperture (and hence its periphery) may have any shape that would be capable of supporting the underside of the bowl. In some forms, the aperture is substantially circular such that its periphery closely matches the cross sectional shape of the stemmed glass bowl, enabling the aperture to even more securely cradle the stemmed glass.

The aperture may have any size, provided that it is smaller than the bowl of the stemmed glass the holder is to hold. Whilst this is dependent on the dimensions of the relevant stemmed glass, the vast majority of stemmed glasses fall within standard size ranges, and the aperture size can therefore be determined based on the relevant class of stemmed glass. Further, as the underside of the bowl of the stemmed class curves outwards, the same aperture can support a number of differently sized bowls; the rims of the glasses will just be relatively higher or lower with respect to the glass holding portion. As will be appreciated, the aperture will ideally be sized so that its periphery can abut a lower portion of the stemmed glass' bowl, but not so low that the vast majority of the bowl is located above the holder because this may make the held glass more susceptible to being tipped over.

The aperture is smaller than the bowl of the stemmed glass, which would usually mean that the foot of the glass would also not be able to pass through the aperture. As such, once within the aperture, the only way for the stemmed glass to escape is via the passage. However, even should the foot of the stemmed glass be capable of passing through the aperture, it would typically require a straight upwards lifting motion to do so. As would be appreciated, such a motion would be unlikely to occur without a user deliberately doing this.

The inventor has found that a substantially circular aperture having a diameter of about 50 mm is suitable for cradling a wide variety of stemmed glasses (especially wine glasses). It is well within the skill of those skilled in the art to determine whether a larger or smaller aperture may be required for any specific form of stemmed glass.

The glass holding portion of the stemmed glass holder also has a passage. The passage may have any structure that provides a way for the stem of the stemmed glass to pass into and out of the aperture (i.e. from the aperture, through the glass holding portion and out of the stemmed glass holder, and vice versa). The passage typically has a width which is only slightly greater than the width of the stem of the stemmed glass to be held by the holder, as the bowl support edge therefore has its maximum length (i.e. extending for almost all of the circumference of the aperture), further reducing the likelihood of the stem entering the passage (from the aperture) inadvertently. In some embodiments, the passage may have curves or bends to even further reduce the risk of the stemmed glass escaping from the aperture.

The inventor has found that a passage having a width of about 16 mm is suitable because few stemmed glasses have a stem with a thickness of more than 15 mm.

The length of the passage will depend on the dimensions of the glass holding portion and aperture, as well as the resilience of the resilient portion (e.g. a resilient member made from a less resilient substance such as a fabric material may need to span a longer distance than would a resilient member made from a more resilient substance such as a plastic material in order for a particular stemmed glass to be safely held in the holder). The passage is typically an elongate passage although, in some embodiments, the passage may be non-elongate (e.g. provided in the form of a gap in a circularly-shaped glass holding portion, with the resilient portion being, for example, a hinged, arc-shaped arm which, when closed, completes the circle).

The passage may extend through the glass holding portion from any side of the stemmed glass holder and in any direction, provided it ultimately ends at the aperture. The most straightforward method of construction is for the passage to extend directly from the side of the stemmed glass holder to the aperture via the shortest distance. In embodiments where the stemmed glass holder is elongate, it will be appreciated that if the passage does not follow the central longitudinal axis of the holder, then the passage will lead to a left or right side of the holder, depending on which of the portion's opposing faces is upwardly facing. Typically, the passage extends between a longitudinal side of the stemmed glass holder and the aperture via the shortest distance.

Thus, the stemmed glass holder of the present invention is adaptable to provide a user with options for using the holder in an ambidextrous manner. For example, the holder can be used by either left-handed or right-handed people (who, for example, may have a preference for which arm of a camping chair, or the like, their wine glass is to be held), or provide for rightwards or leftwards entry of the glass into the aperture, depending on physical restrictions (e.g. leftwards movement of a wine glass into the aperture would be preferred on the right arm of a chair because the user's body might hinder rightwards movement of the wine glass into the aperture) or the user's preference.

In some embodiments, the stemmed glass holder may further comprise a cover. The cover may be made of any suitable material and may improve the holder's glass holding properties or facilitate attachment of the holder to an item, as will be discussed herein.

In some embodiments, the glass holding portion of the stemmed glass holder may be covered by a cover that is, for example, made of a resilient material. Such a cover must have a hole adapted to align with the aperture, and can also have a tab or tabs which overlie the passage (i.e. the cover provides the resilient member(s), as discussed below). The hole in the cover may be slightly smaller than the aperture, which provides some padding between the underside of the stemmed glass bowl and the bowl support edge, thus causing the glass to be cradled even more effectively.

In such embodiments, whilst the bowl support edge might not actually physically touch the underside of the stemmed glass bowl, the bowl and the bowl support edge are still adjacent to each other and ultimately it is still the bowl support edge that supports the bowl.

The cover (or indeed any other visible portion of the holder) may contain indicia, for example advertising or branding material.

The stemmed glass holder also has a resilient portion, which prevents the stemmed glass from easily escaping from the aperture. The resilient portion normally blocks the passage, but is moveable to enable the stem to be slid through the passage.

The resilient portion may have any structure which enables it to block the passage, but which can be moved such that the stem is allowed to pass through the passage. The resilient portion may, for example, have a member which overlies the passage, the member being moveable (e.g. by being pushed or pulled) to enable the stem to be slid through the passage. The resilient portion may, for example, comprise a member which is operable to physically close the passage (e.g. at an inner or outer end of the passage). For example, the resilient portion may be a hinged gate across the passage that is biased into a closed position, but moveable into an open position by a user.

The resilient portion may, for example, comprise a tab which overlies the passage. The tab may extend substantially from the side of the stemmed glass holder to the aperture (i.e. span the entire length of the passage), but need not necessarily do so. For example, a narrower tab (possibly formed from a material having a stronger resilience) that is located between the side of the stemmed glass holder and the aperture may also be suitable for some situations. The tab need not overlie the entire width of the passage, provided that a sufficient proportion of the passage is covered to effectively block movement of the stem through the passage.

The resilient portion may, for example, comprise first and second tabs which extend from opposing sides of the passage and overlap each other (e.g. around the centre of the passage). The degree of overlap required (if at all) would depend on the resilience of the respective tabs, but the inventor has found that an overlap of between about 1 mm and about 3 mm (e.g. about 2 mm) is effective when the resilient portion is formed from a fabric material. Such a resilient portion provides an effectively impenetrable barrier to accidental movement through the passage but, if an appropriate sliding force is applied by a user, the stem can force its way between the overlapping tabs.

It will be appreciated that an underlap of the first and second tabs may also effectively block the passage. For example, sliding a stem having a diameter of 15 mm through a 1-2 mm wide gap between the first and second tabs would still require a user's attention.

The resilient portion may be formed from any resilient material. Appropriate resilient materials will depend on the intended use of the stemmed glass holder and include resilient fabric materials (e.g. canvas, bias tape or bias binding, polyester), leather, soft rubber, wool or brush bristles.

The resilient portion of the stemmed glass holder may be provided in any form whereby it blocks the passage in normal use. In some embodiments, for example, the resilient portion may be in the form of a strip of material (e.g. rubber or fabric), which is affixed to the glass holding portion of the stemmed glass holder proximal to the passage. Alternatively, two strips of such material may be affixed to the glass holding portion proximal to opposing sides of the passage. In some embodiments, for example, the resilient portion may be provided as part of the cover discussed above, which is adapted to cover at least the passage of the glass holding portion (and typically, the entire glass holding portion).

In some embodiments, the stemmed glass holder also has an attacher for attaching the stemmed glass holder to an item (e.g. camping chair, etc.). The attacher attaches the stemmed glass holder to an item, and any means via which the stemmed glass holder may be attached to the item without impeding the function of the stemmed glass holder is suitable. The attacher may be a discrete unit, or may be provided in the form of an attachment portion of the stemmed glass holder (e.g. a portion integral with the glass holding portion or, in embodiments having the cover, integral with the cover). It will be appreciated that an attacher may not be necessary for a number of applications of the stemmed glass holder, such as where the stemmed glass holder is provided integrally with an item (e.g. the distal end of an arm of a camping chair). However, providing a stemmed glass holder with an attacher enables the holder to be provided as a discrete unit for attachment to any item, thus enabling the holder to be portable (i.e. used on a number of items) and capable of being retrofitted to existing items.

In some embodiments, the attacher is adapted to attach to an opposing side of the stemmed glass holder to the glass holding portion. For example, in some embodiments, the glass holding portion and attachment portion are provided at opposing sides of the stemmed glass holder. In use of such embodiments, the glass holding portion is positioned as far as possible away from the item to which the stemmed glass holder is attached so the stemmed glass is substantially free of obstacles which may hinder its insertion into the holder.

The attacher may, for example, be adapted to enable the stemmed glass holder to be releasably attached to the item. In such cases, the holder is portable and can be moved between items (or have its orientation on the same item changed) to suit the user's requirements.

In some embodiments, the attacher is adapted to attach the stemmed glass holder to the item in a variety of orientations. For example, the attacher may enable embodiments of the stemmed glass holder to be attached to the item via either of its opposing faces, which is especially desirable as it can provide the ambidextrous operation of the holder discussed above.

The attacher may have fasteners for attaching the stemmed glass holder to the item. Any fasteners suitable for securely attaching the holder (which is possibly itself holding a full glass of wine) to the item could be used. Examples of suitable fasteners include VELCRO hook-and-loop fastener straps (preferably double sided to enable attachment via either of the opposing faces, as discussed above), buckled straps, clips, hooks and clamps.

In some embodiments, the attacher can be used to attach the stemmed glass holder of the present invention to the armrest of a chair. In this manner, when a user sits on the chair, their wineglass falls naturally to hand as the glass is being cradled directly in-line with the arm of the chair. This is in direct contrast to existing glass holders, which either clip or hang to the side of the chair and are thus awkward and jerky to use. Further, the stemmed glass holder of the present invention can be made to look like it is integrally formed with the arm of the chair (or, indeed, any other item) by using matching materials, colours and shape. This may make the stemmed glass holder of the present invention more aesthetically pleasing to some users.

A specific example of a stemmed glass holder of the present invention will now be described with reference to the accompanying Figures. Referring firstly to FIG. 1, shown is a glass holding portion in the form of plate 10 which forms part of a stemmed glass holder in accordance with an embodiment of the present invention. Plate 10 is a rigid polyethylene board and is rectangularly shaped with upper 12 and lower 14 faces, and has a circular aperture in the form of hole 16 located at one end thereof. The hole 16 is bordered by circular support rim 18, and is sized such that it is smaller than the maximum cross-section of the bowl of a stemmed glass to be held (not shown), so that an underside of the bowl will be supported by the rim 18 (the diameter of the hole 16 in this case is 50 mm). The centre of hole 16 is located on the central longitudinal axis (not shown) of the plate 10, with the closest distance between rim 18, and left 20, right 22 and outer 24 sides of the plate 10 being approximately the same.

Plate 10 also has a passage in the form of channel 26, which extends between hole 16 and, in this particular embodiment and orientation, right side 22. Channel 26 has a width which is slightly greater than the width of the stem of the stemmed glass to be held (not shown). Hole 16 and channel 26 together define a keyhole or lollipop-type shape.

Figure 2:
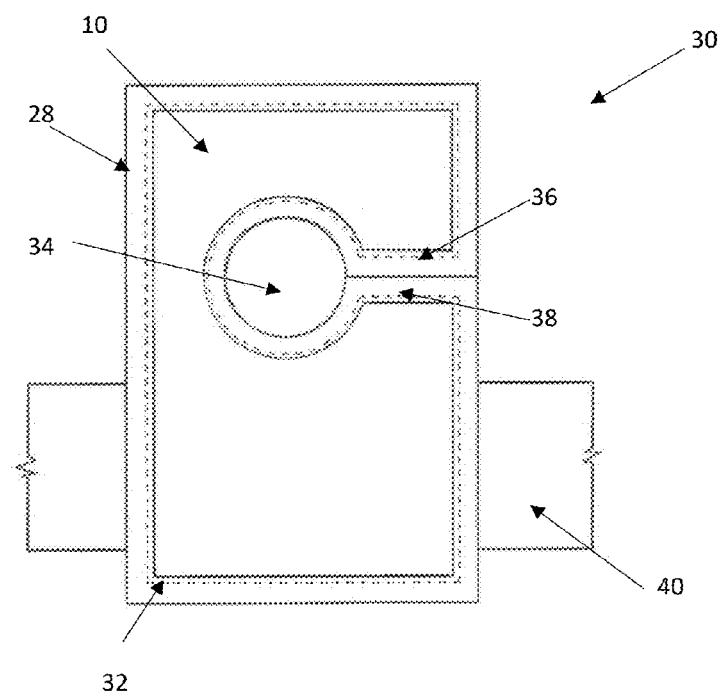
FIG. 2 shows a perspective view of the complete stemmed glass holder of FIG. 1.

Referring now to FIG. 2, plate 10 is encompassed within a cover 28 to provide wine glass holder 30. Cover 28 is made from a fabric material (e.g. 600D polyester, similar to that used on camping chairs) and is edged with 10 mm bias binding 32. Bias binding 32 is a portion of the cover 28 that has been folded over itself a number of times and cut at an angle to 45 degrees to the fibres of the material, thereby giving it a rigid (but resilient) structure. Cover 28 has a hole 34 which is concentric with hole 16, but has a smaller diameter (30 mm in this case). Cover 28 also has a resilient portion in the form of two tabs 36 and 38, which overlie the channel 26 and overlap each other by about 1-2 mm in the centre of the channel 26. Overlapping tabs 36, 38 provide a "fabric lock" via which access through the channel 26 is restricted.

Attached to the underside (i.e. face 14 as shown in FIG. 1) of cover 28 (e.g. by stitching) is a VELCRO hook-and loop fastener strap 40. Strap 40 can be wrapped around an item (e.g. a camping chair) and stuck to itself to securely attach holder 30 to the item. The holder 30 can be attached to the item in the orientation shown in FIG. 2 (i.e. with the channel 26 orientated towards the right hand side), or alternatively, rotated about its longitudinal axis by 180 degrees (i.e. flipped over), whereby the channel will be orientated towards the left hand side. As will be appreciated, this enables the holder 30 to be used on either the left or right arm of a chair (with the channel 26 facing to the left or the right on either arm), thus enabling the ambidextrous uses discussed above.

Figure 3:
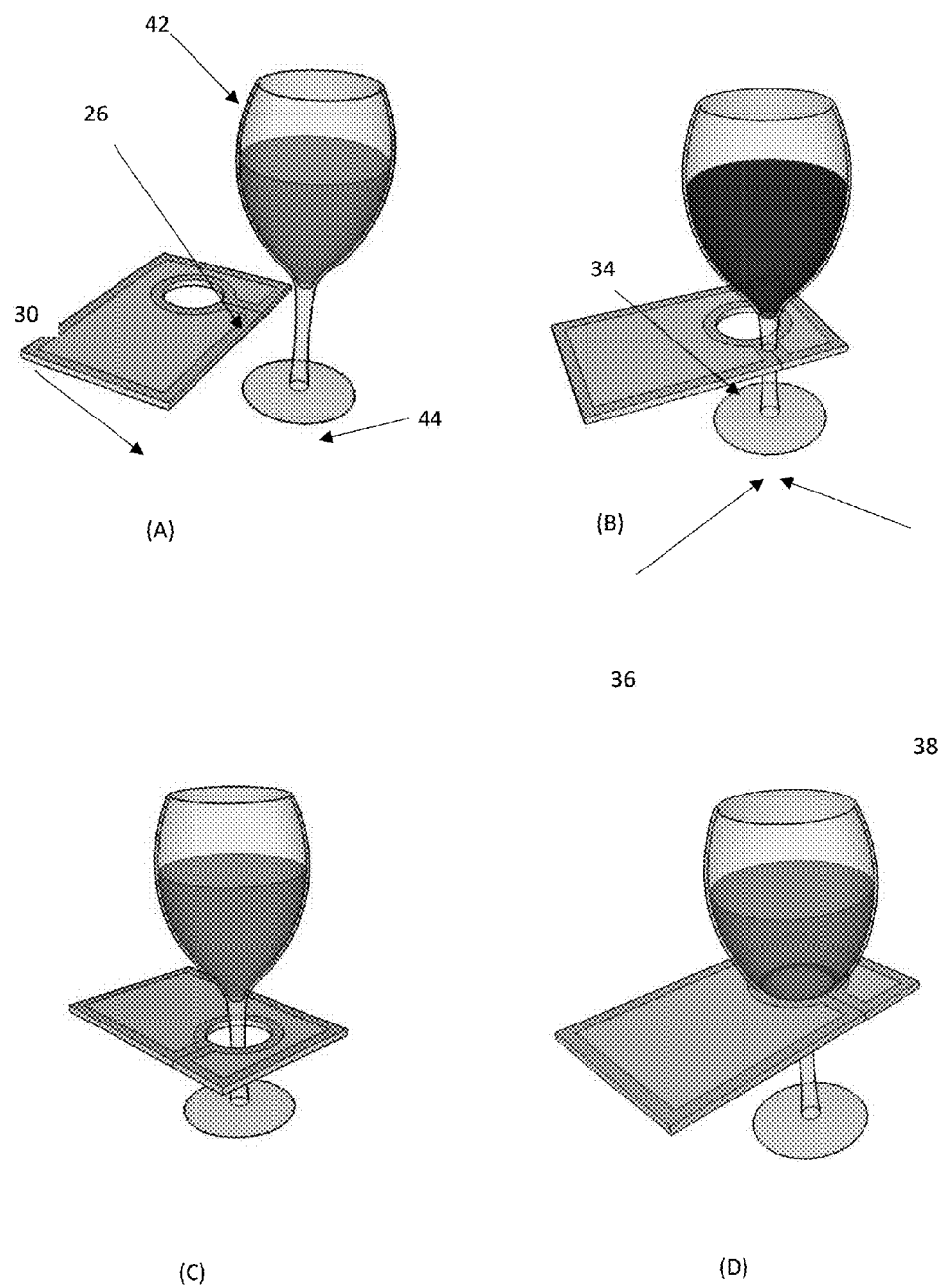
FIG. 3 depicts a wine glass being inserted into a stemmed glass holder in accordance with an embodiment of the present invention.

Referring now to FIGS. 3(A), (B), (C) and (D), shown is the method via which a wine glass 42 can be inserted into the holder 30. In FIG. 3, the VELCRO hook-and loop fastener strap 40 has been omitted for clarity, but it is envisaged that the holder (with the channel facing rightwards) would be attached onto the right arm of a chair behind the forward-most strut on the arm. In FIG. 3(A), the wine glass 42 is adjacent to the channel 26, with the stem 44 of the wine glass 42 aligned with the channel 26. In FIG. 3(B), the wine glass 42 is being slid towards the concentric holes 16 and 34 (i.e. leftwards in the orientation shown in FIG. 3A). As can be seen, the stem 44 is inside channel 26, with the tabs 36, 38 being forced to move apart and allow the stem 44 to pass through the channel 26 in response to the pushing action of the user. The stem 44 passes through the "fabric lock" defined by overlapping tabs 36, 38 until it exits the channel and moves into the holes 16 and 34 (see FIG. 3(C)). Once in this position, the glass 42 can be lowered slightly until, as can be seen in FIG. 3(D), the bowl of the glass 42 is cradled within the bias binding between holes 34 and 16. The slightly smaller size of fabric hole 34 compared with (rigid plastic) hole 16 can provide a cushioning and additional supporting effect, because the fabric immediately around the periphery of hole 34 deforms downwardly under the weight of the glass 42, such that the glass 42 is effectively suspended by the fabric between holes 16 and 34. The glass therefore abuts and is supported by the periphery of hole 16, but only physically contacts the fabric and is therefore unlikely to be scratched or the like. Further, the fabric may be capable of absorbing some of the impact should the holder move unexpectedly (e.g. the chair is jolted), thereby reducing the risk of wine being spilled.

To remove the glass 42, the user simply lifts it slightly and slides it in the opposite direction out of hole 34, through the fabric lock and channel 26, until it is completely separated from the holder 30.

Figure 4:
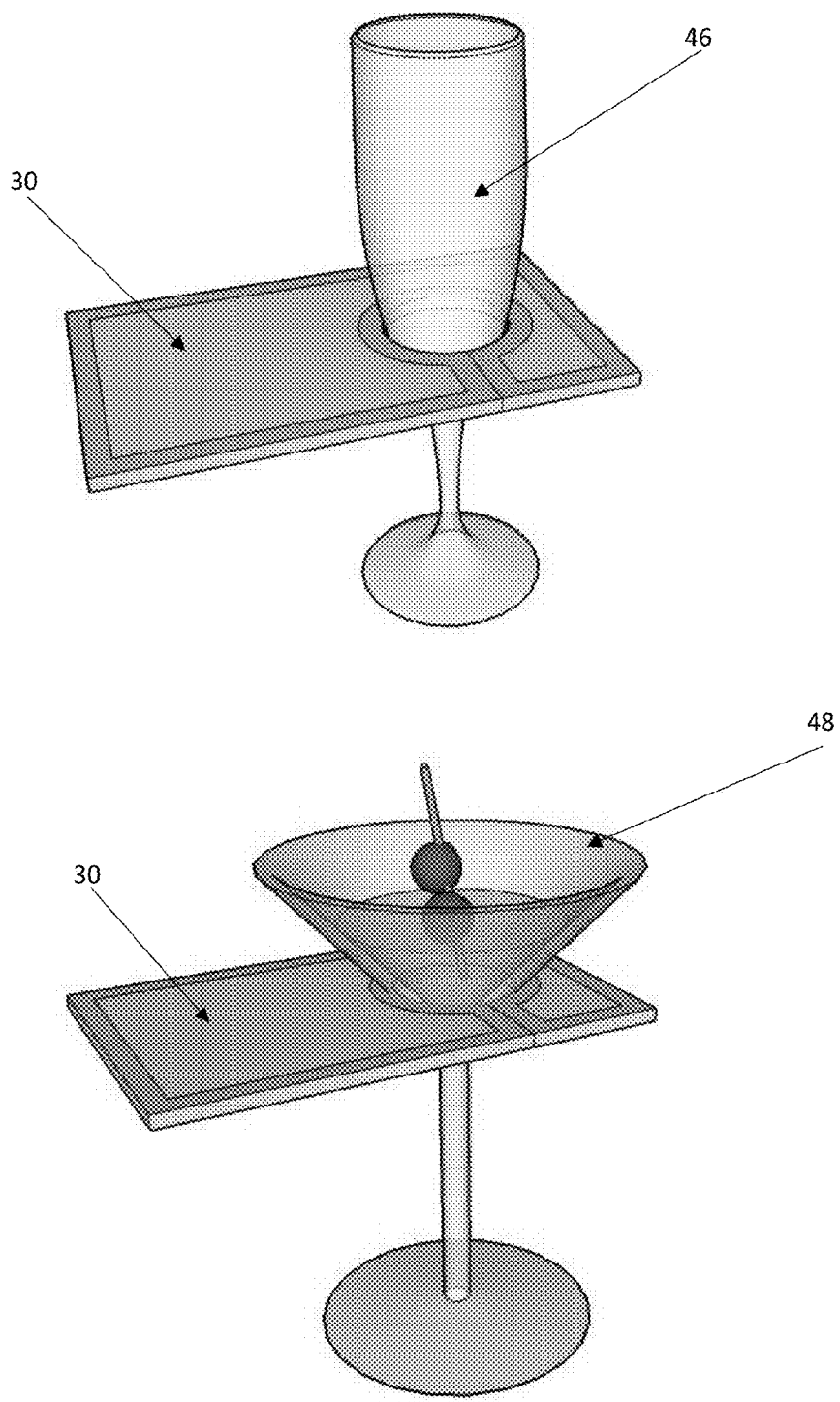
FIG. 4 depicts alternative stemmed glasses being held by the stemmed glass holder of FIG. 3.

Referring now to FIG. 4, shown are alternative stemmed glasses, in the form of champagne glass 46 and martini glass 48, being cradled by holder 30.

As will be appreciated, embodiments of the stemmed glass holder of the present invention may provide a number of advantages, including:

The holder is ambidextrous, and smooth and intuitive to use. Existing holders tend to be jerky and require concentration to use and can often result in spillage, which is counter to the whole idea of relaxing whilst enjoying a drink.

The holder securely holds stemmed glasses, and doesn't spill a drop in normal use, for example when a user sits down and stands up from a chair having the holder.

When sitting in a chair having the holder on its arm, the glass falls naturally to hand as the holder cradles the glass directly in-line with the arm of the chair. Existing holders clip or hang to the side of the chair and can be awkward and jerky to use. The smooth transition from hand to chair is unlike any other holders.

The holder can integrate seamlessly with existing chair designs (or other items) in terms of construction, materials and colours. If the correct colour match is selected, it will be difficult for the casual observer to notice any difference.

The holder is capable of carrying a wide range of branding and advertising messages. It has a simple, elegant and attractive design compared to existing holders.

The holder may have no moving parts to break.

The holder may be removable from an item and is retrofitable to practically any item made from any material.

It will be understood to persons skilled in the art of the invention that many modifications may be made without departing from the spirit and scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A combination of a stemmed glass and a stemmed glass holder, the stemmed glass holder comprising:
   an elongated planar plate having a first surface, a second surface opposite the first surface and edges between the first and second surfaces, comprising:
      an aperture, a periphery of the aperture defining a bowl support edge on each of said first and second surfaces adapted to abut an underside of a bowl of the stemmed glass so as to hold the stemmed glass on either surface; and
      an elongate passage extending from one of the edges of the plate to the aperture via which a stem of the stemmed glass is slidable into and out of the aperture;
   a cover made of a resilient fabric material that extends over the first and second surfaces and edges of the plate along a periphery of the plate and along the periphery of the aperture, the cover having first and second tabs which overlie and block the elongate passage but which are moveable to enable the stem to be slid through the elongate passage; and
   an attacher provided on the cover at an opposite end of the stemmed glass holder from the aperture and comprising a strap adapted to wrap around an end of an arm of a chair whereby the elongate stemmed glass holder extends in a direction in line with the arm of the chair and the stem extends through the aperture without contacting the arm, and whereby the stemmed glass holder is releasably attachable to the end of the arm of the chair selectively in a first orientation with the first surface facing upward and a second orientation with the second surface facing upward.

2. The combination of the stemmed glass and the stemmed glass holder of claim 1, wherein the first and second tabs overlie substantially all of the passage.

3. The combination of the stemmed glass and the stemmed glass holder of claim 1, wherein the first and second tabs overlap each other.

4. The combination of the stemmed glass and the stemmed glass holder of claim 3, wherein the first and second tabs overlap each other around a centre of the passage.

5. The combination of the stemmed glass and the stemmed glass holder of claim 3, wherein the first and second tabs overlap each other by about 2 mm.

6. The combination of the stemmed glass and the stemmed glass holder of claim 1, wherein the aperture is substantially circular.

7. The combination of the stemmed glass and the stemmed glass holder of claim 1, wherein the attacher comprises VELCRO hook-and-loop fastener straps for attaching the stemmed glass holder to the arm of the chair.

8. A combination of a chair,
- a stemmed glass holder and a stemmed glass, the chair comprising an arm and the stemmed glass holder comprising:
- an elongated planar plate having a first surface, a second surface opposite the first surface and edges between the first and second surfaces, comprising:
- a glass holding portion comprising:
- an aperture, a periphery of the aperture defining a bowl support edge on each of said first and second surfaces adapted to abut an underside of a bowl of the stemmed glass so as to hold the stemmed glass on either surface; and
- an elongate passage extending from one of the edges of the plate to the aperture via which a stem of the stemmed glass is slidable into and out of the aperture, and
- a cover made of a resilient fabric material that extends over the first and second surfaces and edges of the plate along a periphery of the plate and along the periphery of the aperture, the cover having first and second tabs which overlie and block the elongate passage but which are moveable to enable the stem to be slid through the elongate passage; and
- an attacher provided on the cover at an opposite end of the stemmed glass holder from the aperture and comprising a strap adapted to wrap around an end of the arm of the chair whereby the elongate stemmed glass holder extends in a direction in line with the arm of the chair and the stem extends through the aperture without contacting the arm, and whereby the stemmed glass holder is releasably attachable to the end of the arm of the chair selectively in a first orientation with the first surface facing upward and a second orientation with the second surface facing upward.

* * * * *